G. A. PARMENTER.
FENDER FOR MOTOR CARS.
APPLICATION FILED JULY 16, 1914.
1,153,566.
Patented Sept. 14, 1915.
2 SHEETS—SHEET 1.
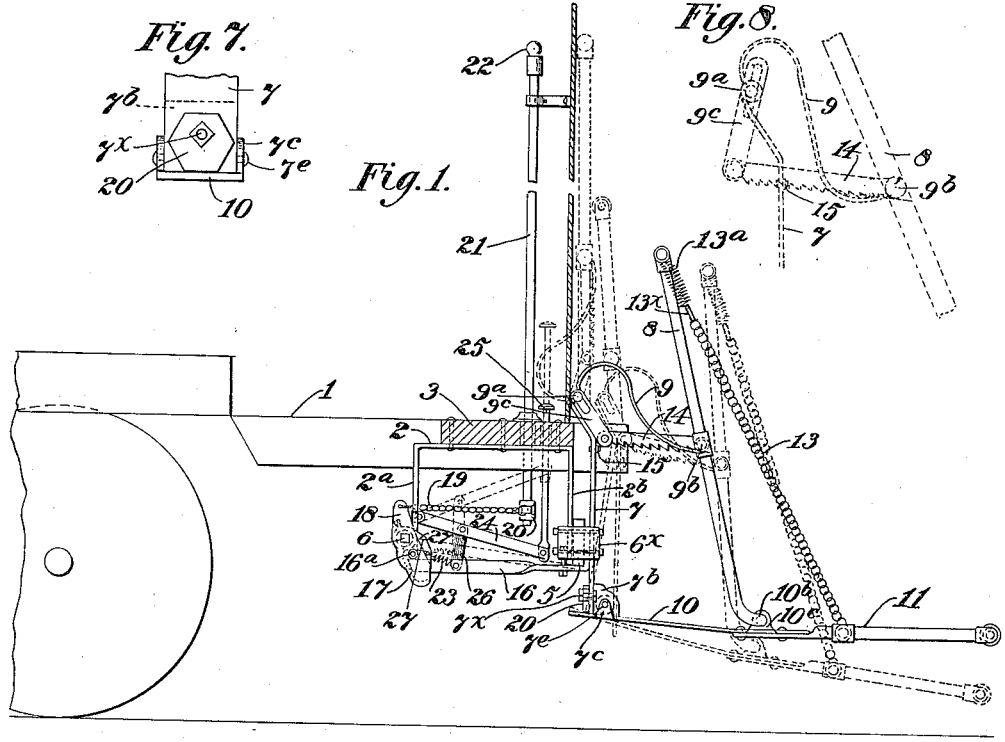
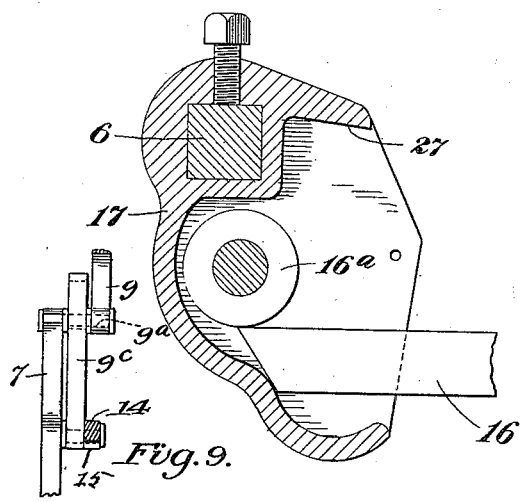
Attest:
C. M. Hamilton
R. C. Durand
Inventor:
George A. Parmenter
by Shinn Middleton Donaldson Shinn
Attys.

G. A. PARMENTER.
FENDER FOR MOTOR CARS.
APPLICATION FILED JULY 16, 1914.
1,153,566.
Patented Sept. 14, 1915.
2 SHEETS—SHEET 2.
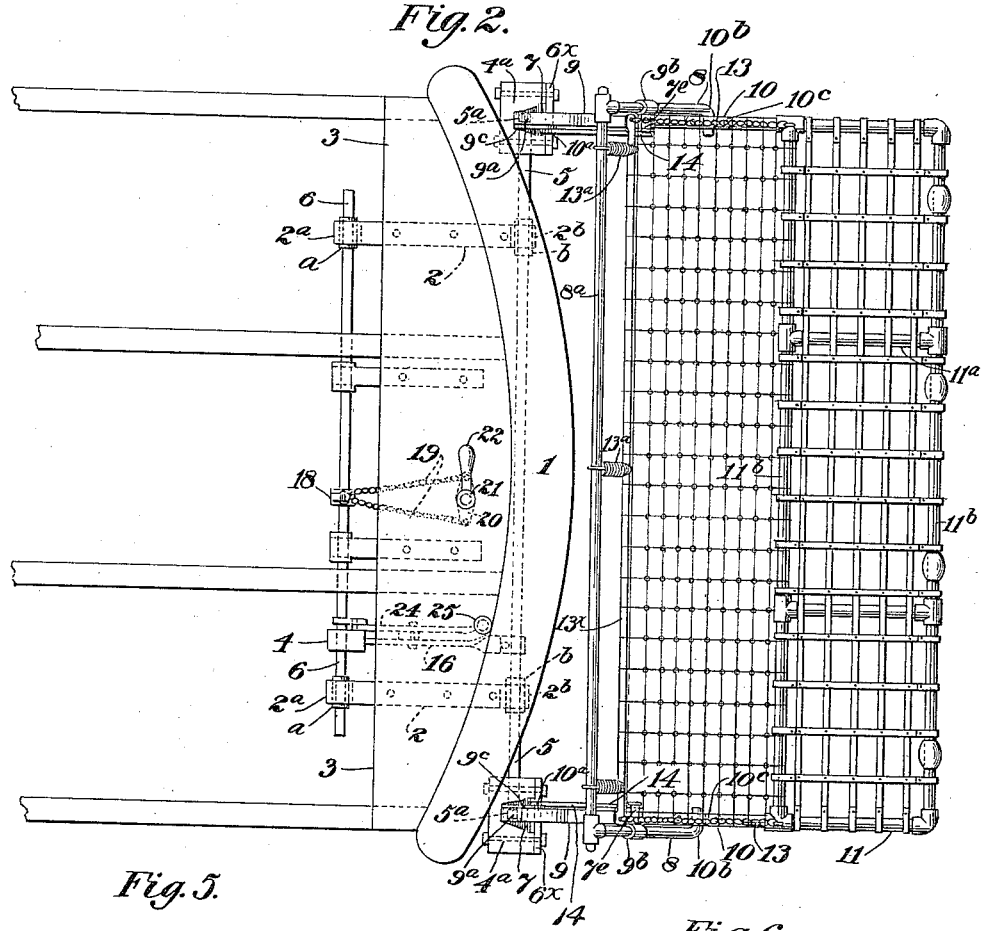
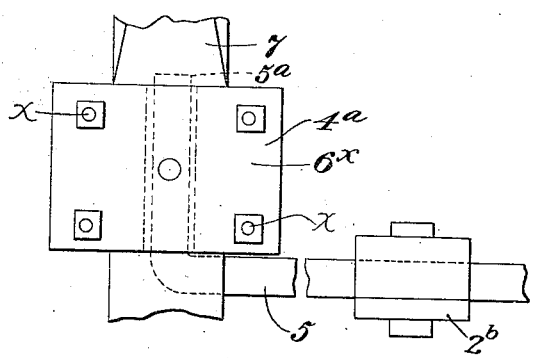
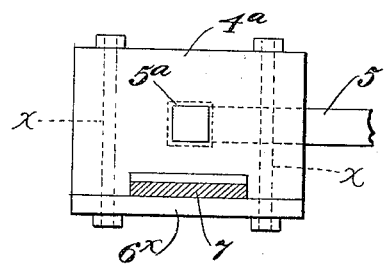
Attest:
O. M. Hamilton
R. E. Ourand
Inventor:
George A. Parmenter.
by Thos Middleton Donaldson & Shea
Attys.

ating the portions designed to catch the body of a person on the track to yield sufficiently to prevent injury without any rebound; to facilitate the proper tripping of the device by the motorman, and which can be readily folded into compact vertical position when not in use.

With these and other objects in view, the invention includes the novel features of construction and arrangement and combination of parts hereinafter described and particularly defined by the appended claims.

A fender embodying my invention is illustrated in the accompanying drawings, in which—

Figure 1 is a side elevation of my improved fender showing diagrammatically a sufficient portion of the front platform of a car to illustrate its application thereto, the fender being shown by dotted lines in the other positions it may assume; Fig. 2 is a plan view of the fender; Fig. 3 is a sectional detail of the catch member 17; Fig. 4 is a sectional elevation taken at right angles to Fig. 3; Fig. 5 is a detail view in elevation of one of the socket blocks as seen looking from the right of Fig. 2 or front of the fender; Fig. 6 is a plan view of the same; Fig. 7 is a detail view of the connection between parts 7 and 10 as seen from the left, Fig. 1; Fig. 8 is a detail illustrating one of the upper links; Fig. 9 is a detail elevation of the upper end of one of the bars 7 showing the connection of the ratchet link and spring link thereto; Fig. 10 is a detail plan view of the rigid pawl or projection 15.

Referring by reference characters to these drawings, the numeral 1 designates the end platform or portion of the car from which the fender is pivotally supported. The preferred manner of supporting the fender is to bolt a pair of members or forgings 2 to the under side of the wooden crown piece 3, these members having downwardly extending arms $2^a$ and $2^b$. These arms are provided at their lower ends with bearing portions or sockets in which are journaled thimbles $a$ and $b$ respectively. The thimbles $a$ receive and rotatably support the shaft 6 which carries the fender locking and releasing mechanism hereinafter more fully described, while the thimbles $b$ receive and rotatably or pivotally support the square rod or bar 5 which constitutes the fender supporting bar. In order to support the fender from the bar or shaft 5, I provide said bar with upwardly turned ends $5^a$ on which are removably supported socket blocks or members $4^a$. These blocks are provided with recessed front faces in which recesses are held the vertical or upright bars 7 by means of clamping plates $6^x$ and bolts $x$. The socket form of connection between the upturned end $5^a$ and the blocks allows the fender to be readily lifted off from one end of the car and applied to the other end. The fender is supported and held in proper position by upper and lower sets of links 9 and 10, the lower links 10 supporting said upright the proper distance from the ground or roadbed, while the upper links tend to yieldingly hold it in position, allowing it to yield when struck by a body, means being provided to prevent rebound, as hereinafter more fully described. The lower links 10 are connected to the lower ends of the bars 7 in such a manner that while downward movement with relation to the upright bars of fender frame 8 7 is prevented by the stop plates 20 hereinafter described, they are yet capable of being lifted up for folding of the fender, and a convenient form of pivotal connection is to provide the links 10 with lugs $7^c$ which are pivotally connected to projections $7^b$ by transverse pins $7^e$. The pivotal connection between the forward ends of the links 10 and the upright bars of the fender frame 8 may be conveniently effected by curving the lower ends of the said bars of said frame forwardly, and then transversely inwardly, as shown at $10^b$, to engage openings in the lugs or brackets $10^c$. The fender is preferably provided with a pick-up portion indicated by the frame members 11, $11^a$, and $11^b$, which is preferably formed as a rigid extension of or carried rigidly by the links 10. A netting is preferably provided extending between the rear bar $11^b$, the side chains 13, and a cross rod $13^x$, which latter is connected to the top rod 8ᵃ of the fender frame by springs 13ᵃ.

In order to yieldingly support the upwardly extending fender frame 8 in proper position and yet allow it to move properly and fold with the other parts into compact position against the front of the car, as shown in dotted lines in Fig. 1, I form the upper links in the shape of leaf springs preferably of the form shown in Fig. 1, and pivotally connect them at their forward ends to pins 9ᵇ on the upright bars of the fender frame 8 and at their rear ends to pins 9ᵃ connected to the upper ends of upright bars or members 7. The pins 9ᵃ may be secured in any suitable manner to the backwardly inclined upper ends of the bars 7, and the springs 9 are preferably pivotally connected to the pins by having their rear ends bent into the form of a sleeve or eye to receive the pin. Connected to the upright bars of the fender frame 8 preferably by use of the same pins 9ᵇ are a pair of ratchet bars 14 which extend rearwardly and the teeth of which are adapted to coact with teeth or lugs 15 carried by the bars 7. The rear ends of these ratchet bars 14 are pivotally connected by links 9ᶜ with projecting portions of the pins 9ᵃ which rest in elongated slots in the links, as clearly shown in Fig. 1. Normally, these links 9ᶜ hold the bars 14 up away from the teeth or lugs 15, but if the fender frame 8 is forced rearwardly as by the impact of a body, the rear ends of the ratchet bars 14 will be carried down by the swinging of the links into vertical position until the teeth engage the lugs 15, and on further movement the ratchet teeth will ride over the lugs 15 and lock the fender frame in its rearward position against the rebound of the springs, the slots of the links permitting the necessary movement of the links as the teeth ride over the holding teeth or lugs.

It is practically necessary that the pick-up portion 11 should be carried normally at such an elevation as to clear the roadbed, but be capable of being dropped when a person is seen upon the track. This is accomplished by providing the rock shaft 5 with a rigidly connected rearwardly extending controlling arm 16, the rear end of which normally rests beneath a roller 16ᵃ carried by a catch member 17 on the rock shaft 6. This catch member 17 is preferably made in the form of a recessed casting adapted to be secured to the shaft 6 by a set screw, and having the roller 16ᵃ journaled within its recessed portion, said recessed portion having an upper wall 27 providing a stop to limit the upward movement of the arm 16. The rock shaft 6 has an upwardly extending arm 18 which is connected by a pair of chains or equivalent connections 19 with the oppositely placed arm 20 on the lower end of the motorman's spindle 21. This spindle is provided at its upper end with a handle 22 in convenient position to be grasped by the motorman, and by reason of the double chain connection it will be evident that the rock shaft will be operated by either a push or pull on the handle, thus avoiding all danger of delay or failure to act were movement in the wrong direction such as might occur were only a one way movement relied on to operate the release. As soon as the roller 16ᵃ passes off the end of the controlling arm 16, the fender is free to drop by gravity to bring the pick-up portion into the position shown by the lower dotted lines in Fig. 1. A spring 23 may be provided suitably connected at one end to the arm 17, and at the other end to the controlling arm 16 for normally holding the parts in the position shown in full lines in Fig. 1.

In resetting the fender I provide a lever 24 pivoted at its rear end to the arm 2ᵃ, and at its front end to the lower end of the treadle 24, an intermediate portion of the lever being connected by a link 26 with the lever 16.

In order to readily adjust the fender so as to vary the height of the pick up portion 11 from the roadbed, I mount on the back of the bars 7 non-circular plates 20, shown in Fig. 7 as hexagonal. Each of these plates is rotatably connected with its bar 7 by a bolt 7ˣ, and one of its flat sides bears against the upper face of the rearward extension of the link 10. Thus by turning the plate 20 one of its faces more or less distant from the pivot may be caused to act as a stop to limit the upward movement of the portion of the link 10 in rear of its pivot.

If desired the whole fender and release mechanism may be made adjustable to fit cars of different heights by providing the bars 2ᵃ and 2ᵇ with a series of holes and bolting the bearing portions or members for the thimbles $a$ and $b$ adjustably to the bars 2ᵃ and 2ᵇ.

I claim as my invention:—

1. A fender or guard comprising substantially upright bars adapted for attachment to the front of a motor vehicle, a substantially upright fender frame, upper and lower sets of links, each link pivotally connecting respectively with an upright bar and with said fender frame, the upper links comprising curved springs, and a pick up frame forming a rigid extension of said lower links.

2. A fender of the class described comprising a pair of substantially upright members, a fender frame, upper and lower sets of links, each link pivotally connecting respectively with the fender frame and one of said upright members, and means interposed between the upright members and lower links for limiting the downward movement of the latter.

3. A fender of the class described comprising a pair of substantially upright members, a fender frame, upper and lower sets of links, each link pivotally connecting respectively with the fender frame and one of said upright members, and adjustable means interposed between the upright members and lower links for limiting the downward movement of the latter.

4. In a fender of the class described, a pair of supporting bars, a pair of fender supporting members pivotally connected to said bars and having portions extending in rear thereof, and adjustable stops carried by the bars and contacting with said rearwardly extending portions.

5. An apparatus of the class described comprising a pair of substantially upright members, a substantially upright fender frame, upper and lower sets of links, each link pivotally connecting respectively to an upright member and said fender frame, said upper links comprising leaf springs, a pick up frame projecting forwardly from said lower links, and lug and ratchet mechanism coöperating with said fender frame to prevent rebound after compression of the leaf springs.

6. An apparatus of the class described comprising a pair of substantially upright members, a substantially upright fender frame, upper and lower sets of links, each link pivotally connecting respectively to an upright member and said fender frame, said upper links comprising leaf springs, a pick up frame projecting forwardly from said lower links, a ratchet bar pivotally connected with said fender frame at one end, a link pivotally connected with said ratchet bar at the other end and having a sliding pivotal connection with a stationary pin, and a rigid lug supported from said upright member arranged to coact with said ratchet bar.

7. In combination a motor car, a fender having its lower part pivotally supported from the car, a resilient connection between the upper part of the fender and the car, a ratchet bar pivotally connected to the fender and extending rearwardly therefrom, a rigid lug with which said ratchet bar coacts, and a link connecting the free end of said bar with a part carried by the car, one of the pivotal connections of the link being a sliding connection.

8. The combination with a motor car, of a rock shaft pivotally supported at the front thereof and having a rearwardly extending controlling arm, a pair of substantially upright members carried by said rock shaft, a fender, upper and lower sets of links, each link pivotally connecting respectively to an upright member and the fender, a catch lever for holding said controlling arm depressed, and means for operating said catch lever.

9. The combination with a motor car, of a rock shaft pivotally supported at the front thereof, a fender supported from said rock shaft, a controlling arm extending rearwardly from said rock shaft, a second rock shaft carrying a catch lever for engaging said controlling arm, an arm on said second rock shaft, a vertically extending spindle suitably journaled and having an operating handle at its upper end and a pair of oppositely extending arms on its lower end, and a pair of flexible connections from said pair of arms to the arm on the second rock shaft.

10. The combination with a motor car, of a rock shaft pivotally supported at the front thereof, a fender supported from said rock shaft, a controlling arm extending rearwardly from said rock shaft, means for holding and releasing said controlling arm, a resetting lever above the controlling arm, and a link connecting the resetting lever with the controlling arm and means for operating said resetting lever.

11. The combination with a motor car, of a pair of substantially upright members pivotally supported from the end thereof, a pair of links pivotally connected to the lower ends of said members and normally supported in substantially horizontal position, a fender frame having its lower end pivotally connected with said links, yielding means for maintaining said fender frame in position, and a pick up frame carried by said links.

In testimony whereof, I affix my signature in presence of two witnesses.

GEORGE A. PARMENTER.

Witnesses:
GUSTAVUS H. SPARROW,
ALICE POWERS.

Copies of this patent may be obtained for five cents each, by addressing the "Commissioner of Patents, Washington, D. C."